Nov. 19, 1963 A. SNIJDERS 3,111,626

GATING CIRCUIT WITH STABILIZING MEANS AT THE VOLTAGE DIVIDER OUTPUT TAP OF EACH MULTIVIBRATOR THEREIN

Filed Oct. 23, 1959 4 Sheets-Sheet 1

INVENTOR:
ANTONIE SNIJDERS.
BY
Hugh A. Kirk
ATT'Y.

INVENTOR:
ANTONIE SNIJDERS
BY Hugh A. Kirk
ATT'Y.

INVENTOR:
ANTONIE SNIJDERS.
BY
Hugh A. Kirk
ATT'Y.

Nov. 19, 1963 A. SNIJDERS 3,111,626

GATING CIRCUIT WITH STABILIZING MEANS AT THE VOLTAGE DIVIDER OUTPUT TAP OF EACH MULTIVIBRATOR THEREIN

Filed Oct. 23, 1959 4 Sheets-Sheet 4

INVENTOR:
ANTONIE SNIJDERS.
BY
Hugh A Kirk
ATT'Y.

3,111,626

GATING CIRCUIT WITH STABILIZING MEANS AT THE VOLTAGE DIVIDER OUTPUT TAP OF EACH MULTIVIBRATOR THEREIN

Antonie Snijders, The Hague, Netherlands, assignor to De Staat der Nederlanden, ten deze Vertegenwoordigd door de Directeur-Generaal der Posterijen, Telegrafie en Telefonie, The Hague, Netherlands Filed Oct. 23, 1959, Ser. No. 848,473
17 Claims. (Cl. 328—92)

This invention relates to a gating circuit. More particularly, it deals with such a circuit comprising input and output trigger type switching devices for an electronic static control means comprising opposed unidirectional resistances connected to a junction, to which junction is applied a constant potential, whereby the potential at the output of the output circuit may be controlled by the potential applied to the input circuit through said junction.

This invention is a continuation-in-part application of copending Antonie Snijders application Serial No. 300,817, filed July 25, 1952, now U.S. Patent No. 2,934,603 issued April 26, 1960, which discloses different code converter circuits, such as for multi-element telegraph code signals, embodying the gating circuits of this invention.

It is an object of this invention to produce a simple, efficient, effective and economic gating circuit which can be readily adapted for response to either positive or negative, alternating or direct current potentials, as well as different potential levels, and repeat such potentials at a constant amplitude.

Another object of this invention is to produce such a gating circuit which is stabilized and in which there is no change in the voltage to be gated or transmitted through the circuit whereby a plurality of said circuits may be employed in series or in parallel without losing the significance of the potential or signal passed through them.

Another object is to produce such a gating circuit including an electronic static control means, which in said copending application was referred to as "electronic relay cells means," for effecting, affecting and/or controlling the potential between two points in the circuit, has no moving parts, is not subjected to the inversion time like a moving armature in a relay, is more versatile than a relay, may control a particularly unlimited number of like circuits, is side stable, does not require a constant current, and prevents high current at its output.

Another object is to produce such a gating circuit having a static control means which has a high input impedance, a low output impedance, and an internal impedance between that of its input and output trigger type circuits, so that a large amount of current is prevented from occurring at the output and thereby prevents damage to the elements making up the static control means.

Another object is to produce a specific multi-vibrator type of trigger circuit for the input and the output trigger circuits making up the gating circuit of this invention, which trigger circuits provide substantially constant potentials for the electronic static control means connected between them and are not affected by large changes in potential.

Generally speaking, the gating circuit of this invention comprises at least one input and one output multi-vibrator type of trigger circuit or switching device, the output terminal of which input circuit is connected by a conductor means to the input terminal of the output circuit. This conductor means comprises the electronic static control means mentioned above and includes in series a pair of unidirectional resistance or rectifiers, each of which unidirectional resistances have an anode terminal and a cathode terminal, with like terminals of said unidirectional resistances being connected together at a junction between them. To this junction is also applied a constant potential which corresponds in polarity to that of the terminals of the unidirectional resistances connected thereto. That is, if the anodes of the unidirectional resistances or rectifiers are connected to the junction, then a constant positive potential is applied to this junction; while if the cathodes of the two unidirectional resistances or rectifiers are connected to the junction, then a negative potential is applied to the junction. If desired, the constant potential source applied to this junction may be at a preselected level and/or connected through a leakage resistance, which resistance must be lower in value than that of the resistance of the output circuit, but greater in value than that of the input circuit. Thus, the input trigger circuit must have an internal resistance or impedance lower than that of the output trigger circuit in order for the gating circuit of this invention to function properly.

Additional unidirectional resistances or rectifiers may also be connected to said junction from other input and output circuits provided all of said unidirectional resistances or rectifiers have like terminals connected to said junction.

Furthermore, if desired, the conductor means between one input and one output may include a plurality of junctions, with one unidirectional resistance between each two adjacent junctions, with different constant potentials applied to each junction. Also additional input and output circuits may be connected to said junctions.

The input and output multi-vibrator type of trigger circuits or switching devices have their output and input terminals, respectively, connected to like terminals of the unidirectional resistances or rectifiers but opposite from their terminals connected to said junction. These input and output circuits are of the multi-vibrator type and may each comprise a pair of electron tubes and a plurality of voltage dividers, which dividers may be varied or replaced by potentiometers. Through these voltage dividers the two electron tubes of both the input and output switching devices may be connected together at a given level for stabilization of the entire gating circuit, as well as with other gating circuits which may be used in a complete system, such as a code converter system disclosed in said above mentioned Snijders copending parent application.

The above mentioned and other features and objects of this invention and the manner of attaining them are given more specific disclosure in the following description of embodiments of the invention taken in conjunction with the accompanying drawings, wherein.

Figure 1:
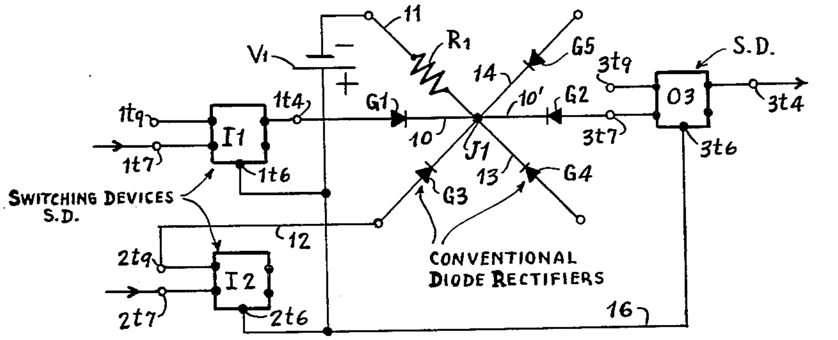
FIG. 1 is a schematic wiring diagram of a gating circuit according to this invention embodying an electronic static control means with the cathode sides of its unidirectional resistances or rectifiers connected to its junction and showing a stabilizing circuit between the input trigger circuits.
Figure 2:
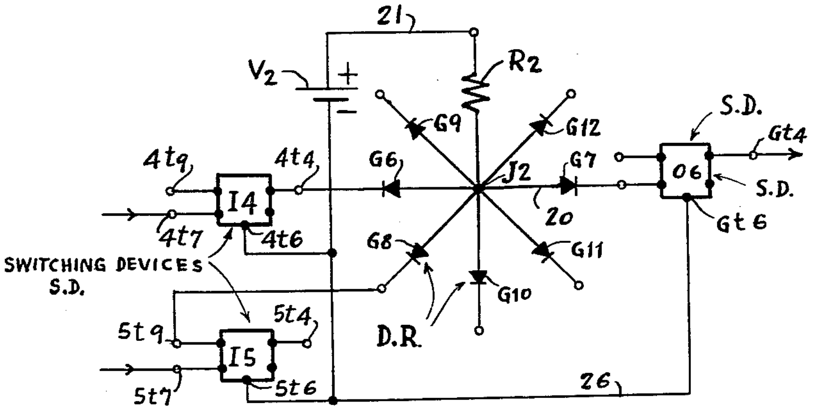
FIG. 2 is a schematic wiring diagram of another gating circuit according to this invention embodying a static control means similar to that shown in FIG. 1 but with the anode sides of the rectifiers connected to its junction.
Figure 3:
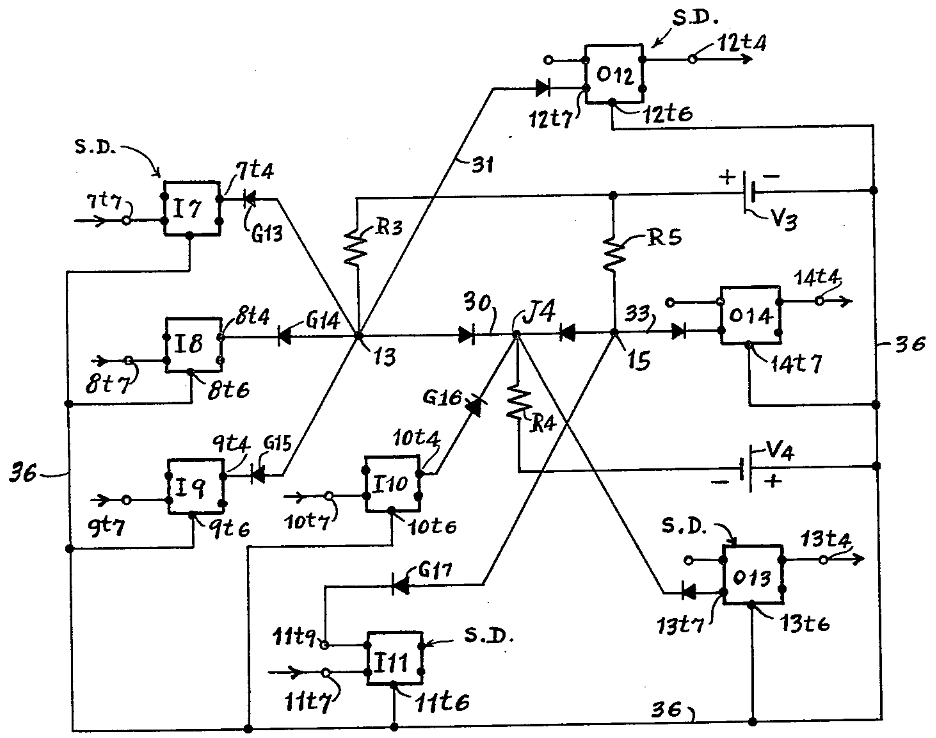
FIG. 3 is a schematic wiring diagram of a gating circuit comprising a series of three electronic static control means similar to that shown in FIG. 2, with the junction of each connected to a plurality of input and output trigger circuits, all of which are interconnected by a stabilizing circuit.
Figure 4:
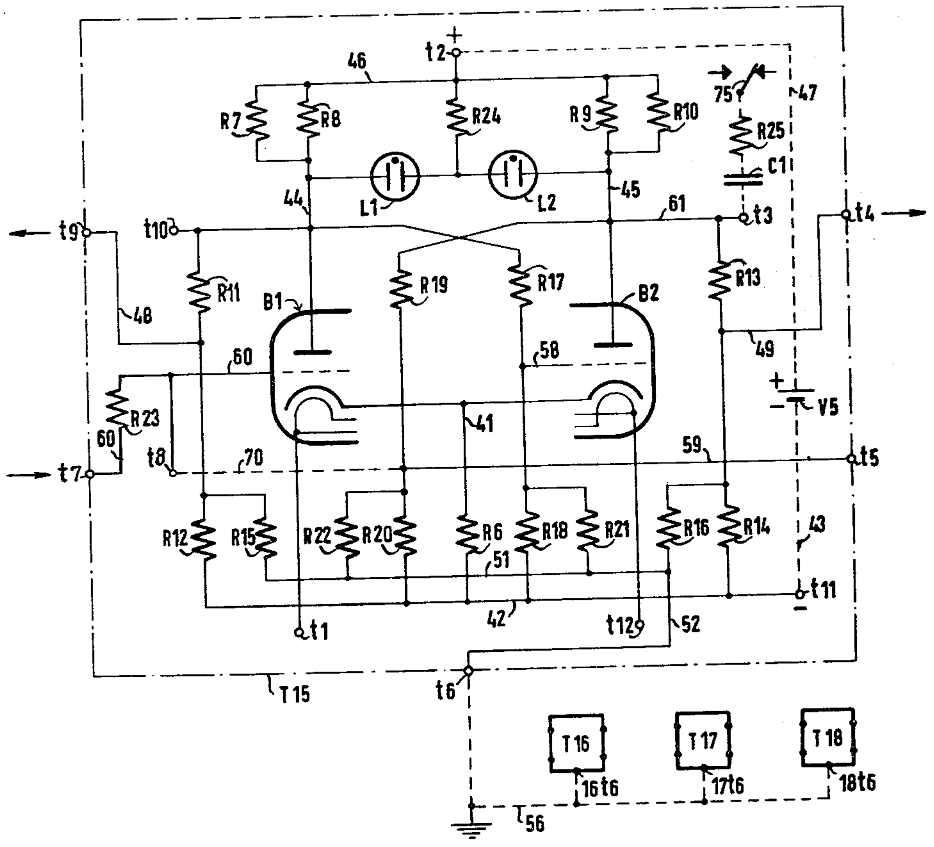
Figure 5:
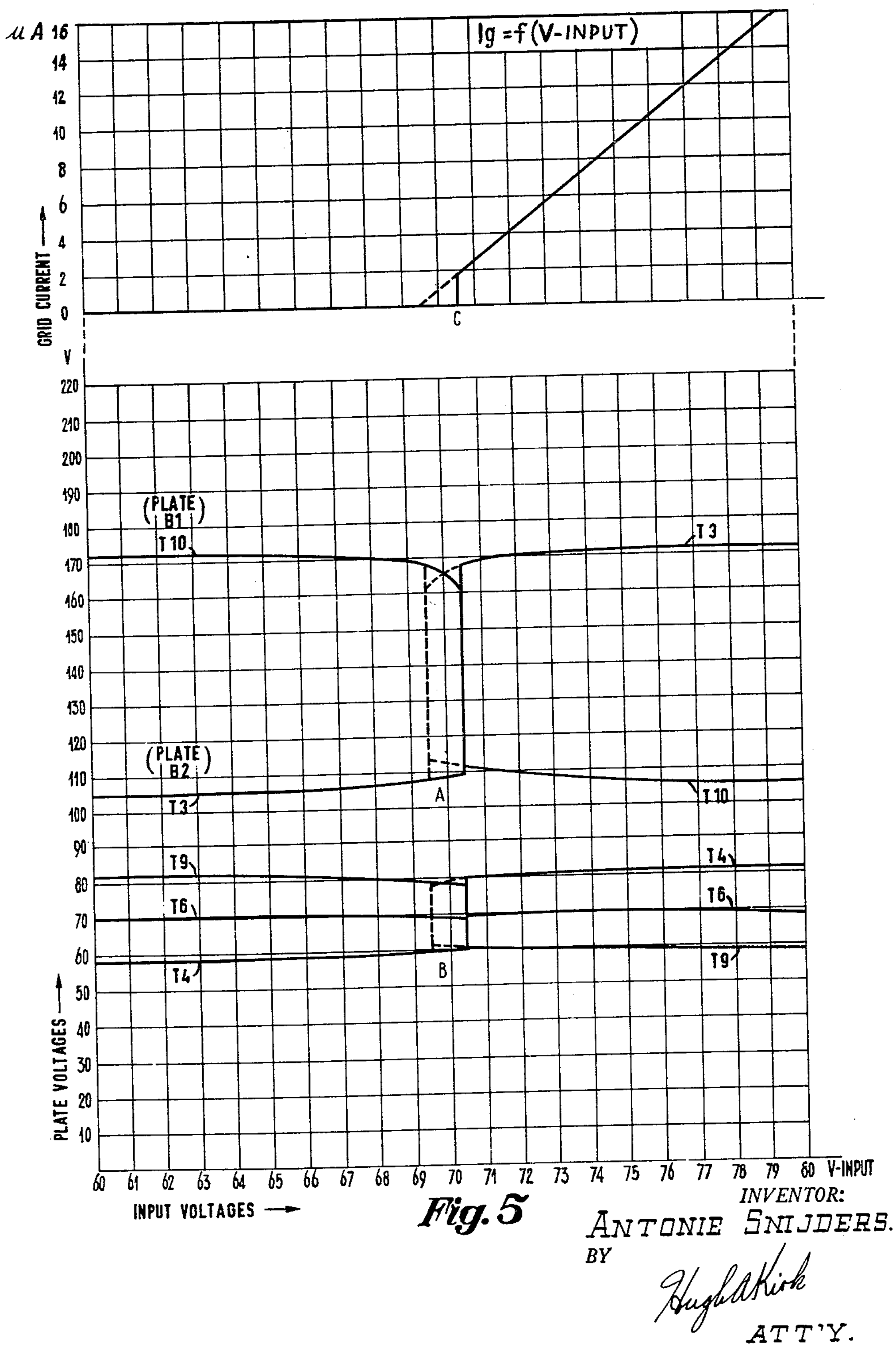

FIG. 4 is a schematic wiring diagram of a switching device involved in this invention comprising a multi-vibrator type of trigger or flip-flop circuit as may be employed for the input and output circuits shown in the boxes in the diagrams of FIGS. 1, 2, and 3; and FIG. 5 is a graph of the plate output voltages for various input voltages at different terminals of the type of multivibrator trigger circuit shown in FIG. 4.

Referring specifically to FIG. 1, there is shown a gating circuit having a conductor means comprising an electronic static control means embodying a plurality of unidirectional resistances having their cathodes joined together at a common junction J1, which conductor means connects two input circuits I1 and I2 (to which both positive and negative potentials may be applied), to an output circuit O3. This electronic static control means which connects the output terminal 1t4 of the input circuit I1 with the input terminal 3t7 of the output circuit O3, includes the common junction J1 on the conductor 10 to which junction is applied a negative potential through a conductor 11 and a leakage resistor R1 from a direct current source or battery V1, and a pair of unidirectional resistances or rectifiers G1 and G2 between the junction J1 and the input circuit I1 and the junction J1 and the output circuit O3, respectively. The resistance R1 is so chosen that the impedance of the connection to the source V1 is greater than the impedance through the rectifier G1 when conductive and less than the impedance through the rectifier G2 when conductive, or intermediate of the impedance from the junction J1. Thus, if a positive potential were applied to the output terminal 1t4 of the input circuit I1, the junction J1 would become positive, which positive potential would be blocked by the unidirectional resistance G2 so as not to affect or change the potential at the terminal 3t7 of the output circuit O3. While on the other hand, if a negative potential were applied to the output terminal 1t4 of the input circuit I1, rectifier G1 will block negative current flow to the input circuit I1 and the junction J1 becomes negative, which negative potential would be conducted through the unidirectional resistance G2 to apply a negative potential to the input terminal 3t7 of the output circuit O3, thus operating the output circuit O3. Since the potentials from the input circuit I1 and/or I2 predominate over the negative potential source V1 due to the lower internal impedances of said input circuits, the constant negative potential alone from the source V1 applied to the junction J1 is prevented from operating the output circuit O3 if any of the input rectifiers G1 or G3 are unblocked by positive potentials applied to them from their corresponding input circuits I1 or I2.

The input circuit I1 may be a multi-vibrator trigger type circuit, as will be described later and is disclosed in FIG. 4, from which two different potentials may be had from its output terminals 1t4 and 1t9, respectively, by application of different potentials to its input terminal 1t7. The output terminals take opposite polarity, the output terminal 1t4 having the same polarity as input terminal 1t7. The output circuit O3 may also be a trigger type circuit as shown in FIG. 4 with its input terminal 3t7 connected through the conductor 10′ to the anode or output terminal of the rectifier G2.

There is also shown in FIG. 1 an additional input circuit I2 with its other output terminal 2t9 connected through conductor 12 and rectifier G3 to the junction J1. Thus, for example, if a positive potential were applied to the input terminal 2t7 of the input circuit I2, then a negative potential would occur at its output terminal 2t9, and if this negative potential would be applied to the junction J1 together with the previously mentioned negative potential applied to the junction J1 from the output terminal 1t4 of the input circuit I1, there would be a negative potential applied to the input terminal 3t7 of the output circuit O3. However, if a negative potential were applied to the input terminal 2t7 of the input circuit I2, then a positive potential would be applied to the junction J1 through the rectifier G3, so that no negative potential, whether or not one was applied from the terminal 1t4 of the input circuit I1, would be applied to the input terminal 3t7 of the output circuit O3, and no change in state of the output circuit O3 would occur. Accordingly, with the connections shown in FIG. 1, the output circuit O3 will only change its state in the event all of the potentials applied to the junction J1 are negative.

Furthermore if desired, additional conductors 13 and 14 containing rectifiers G4 and G5, respectively, may be connected to the junction J1, which conductors may be connected either to other input and/or to other output circuits.

If all of the rectifier unidirectional resistances shown in FIG. 1 were reversed so that their anodes were connected to a junction instead of their cathodes, then we would have the circuit shown in FIG. 2 in which a positive potential instead of a negative potential will be the one which will control the output circuit O6 through its input terminal 6t7. In this arrangement the input circuit I4 has a relatively low output impedance with respect to the input impedance of the output circuit O6. These input and output circuits I4 and O6 are connected between their output and input terminals 4t4 and 6t7, respectively, by a common conductor 20 of a conductor means or electronic static control means having a junction J2 and a plurality of unidirectional resistors or rectifiers G6 through G12 having their anodes connected thereto. Also connected to the junction J2 through conductor 21 is a constant positive potential from a source such as battery V2, which connection through conductor 21 is also passed through a leakage resistance R2 so selected that said connection has an impedance intermediate that of the input and outputs also connected to the junction J2. Similarly, another input circuit I5 may be connected through a conductor 22 and the rectifier G8 to the junction J2, which corresponds in effect to the input circuit I2 described in FIG. 1. Also if desired, other of the rectifiers G9, G10, G11 and G12 may be connected either to input or output circuits, without departing from the scope or operation of this circuit.

However, in this gating circuit of FIG. 2, any negative potential applied to either of the input circuit terminals 4t4 or 5t9 through rectifiers G6 and G8, or to any of the other one or more of the inputs to rectifiers G9 through G12 shown in FIG. 2, would prevent a positive potential to be applied through rectifier G7 to the input terminal 6t7 to operate the output circuit O6. Conversely, if all of the input circuits connected to the junction J2 were positive, then and only then would the rectifier G7 permit the operation of the output circuit O6 by the positive potential applied from the direct current source V2. Thus the gating circuit shown in FIG. 2 permits the output circuit O6 to respond to all positive inputs and to any negative (or not all positive) inputs applied to the junction J2, respectively.

More than one of the electronic static control means including its junction J2 as shown in FIG. 2, may be arranged in series with additional input and output trigger circuits as shown in FIG. 3, wherein three junctions J3, J4 and J5 are provided along a conductor 30. These junctions are successively controlled depending upon the conditions of the input trigger circuits I7, I8, I9, I10 and I11 to apply either positive or negative potentials at their corresponding output terminals 7t4, 8t4, 9t4, 10t4 and 11t9 connected directly through rectifiers G13, G14, G15, G16 and G17, respectively, to said junctions and thence control one or all of the output circuits O12, O13 and O14 connected to each one of said junctions J3, J4 and J5, respectively. In order that the impedances of the input and output circuits connected to the series of junctions J3, J4 and J5 may be properly matched, separate constant potential sources from the batteries V3 and V4 are applied to them, through properly valued ohmic resistances R3, R4 and R5, respectively, so that the impedance of the input and output circuits of each of the three stages are correspondingly greater from the left to the right of the circuit shown in FIG. 3. For example, junction J3 is connected to make any negative potential applied to it from the input circuits I7, I8 and I9 to block the junction J4 and the output circuit O12. This junction J4 and its output circuit O13 will be blocked by any positive potential which is applied to it from the junction J3 and the input circuit I10. The junction J5 is further connected to be blocked by any negative potential applied to it from the junction J4 and the input circuit J11, so that the final output circuit O14 is controlled by the conditions of the five input circuits I7, I8, I9, I10 and I11. If desired, the triggering voltages for the output circuits may be adjusted so as to trigger them when a predetermined potential level has been reached and applied to their input terminals.

A wiring diagram of one form of the input and output circuit T15 for the boxes shown in the schematic wiring diagrams of FIGS. 1, 2 and 3 is shown in FIG. 4, in which all of its terminals *t1* through *t12* have corresponding reference characters with those shown on the boxes. This circuit T15 is similar to a multi-vibrator type trigger or flip-flop circuit and is bistable or has two possible states of equilibrium. This type of trigger circuit comprises a pair of electron tubes, such as triodes B1 and B2, which are connected by means of a number of resistors, and may also contain a pair of neon indicator lamps L1 and L2 to indicate which one of the two tubes B1 and B2 is conductive at any time. These two tubes B1 and B2 have a common cathode resistor R6 which may be connected through conductors 41 and 42, terminal *t11*, and conductor 43 to the negative pole of the battery V5. The anodes of the tubes are connected through conductors 44 and 45, respectively, to parallel resistors R7/R8 and R9/R10 which then are connected through conductor 46, terminal *t2* and conductor 47 to the positive pole of battery V5.

Voltage dividers R11/R12 and R13/R14 may be connected from the anodes of the tubes B1 and B2, respectively, to the negative pole of the battery V5 with the intermediate taps of these voltage dividers being connected through conductors 48 and 49 to the output terminals *t9* and *t4*, respectively. If desired, the values of the resistors R11/R12 and R13/R14 may be varied, and each voltage divider pair of resistor may be replaced by a potentiometer in which the variable tap is connected to the conductors 48 and 49. If the resistance R11 equals R13 and the resistance R12 equals R14 in ohmic values, then when the circuit triggers from one condition or state to the other, equal potentials will be alternately applied to the output terminals *t9* and *t4*.

The two output terminals *t9* and *t4* of this trigger circuit may be connected together through a conductor 51 and a pair of resistors R15 and R16 in series, which resistors may be of equal value, and have a conductor 52 connected between them extending to another terminal *t6* which terminal *t6* may be connected by a conductor 56 to similar terminals 16*t6*, 17*t6* and 18*t6* of each of a plurality of other similar trigger circuits T16, T17 and T18, respectively, for stabilizing the operation of all of said trigger circuits in a given system. If desired, these terminals 16*t6*, 17*t6* and 18*t6* may be connected to a common ground maintained at a potential between that of the positive and negative output terminals *t2* and *t11*. Thus the terminals *t6*, that is, terminals 1*t6*, 2*t6* and 3*t6* of the input and output circuit I1, I2 and O3 shown in FIG. 1 are connected together by a common conductor 16 to the positive pole of the battery V1 which battery also supplies the potential for the junctions J1 through the resistor R1. Similarly the terminals 4*t6*, 5*t6* and 6*t6* of the input and output circuits I4, I5 and O6 shown in FIG. 2 are connected together by a common conductor 26 to the negative pole of the battery V2. And also in FIG. 3, all the input circuit I7, I8, I9, I10, I11 and the output circuits O12, O13 and O14 may have their *t6* terminals connected together through a common conductor 36. Thus the box circuit T15 shown in FIG. 4 surrounded by the dot dash line, corresponds to each of the boxes shown in FIGS. 1, 2 and 3, and all the output and input circuits shown in each of the gating circuits of FIGS. 1, 2, 3 and 4 are stabilized with respect to each other.

This trigger circuit or switching device T15 shown in FIG. 4 also has two additional voltage dividers or potentiometers R17/R18 and R19/R20 connected from the respective anodes of the tubes B1 and B2 to the negative battery pole of the battery V5 through conductor 42 and terminal *t11*. These two high ohmic voltage dividers or potentiometers R17/R18 and R19/R20 are in parallel with the voltage dividers or potentiometers R11/R12 and R13/R14 mentioned above, and may have the same respective ohmic values. The intermediate tap to the voltage divider R17/R18 is connected via conductor 58 to the control grid of the tube B2 and also through the resistor R21 and conductors 51 and 52 to the stabilizing or ground terminal *t6*. The intermediate tap of the voltage divider or potentiometers R19/R20 is connected via conductor 59 to the terminal *t5* and also through a resistor R22 and conductors 51 and 52 to the same stabilizing terminal *t6*, thus providing further stabilization for the circuit T15, and all of the other similar circuits which may be connected together in the gating circuits or systems shown in FIGS. 1, 2, 3 and 4, through the conductors 16, 26, 36 and 56, respectively.

The control grid of the tube B1 is directly connected via the conductor 60 to the input terminal *t8* and also may be connected via the resistance R23 to another input terminal *t7* to limit the amount of grid current flowing through the tube B1 when it is conductive. Since a directly connected input terminal *t8* will surge with substantial amounts of grid current, this terminal should not be used for controlling the trigger circuit from an electronic static control means comprising the rectifiers and junctions as shown in this invention, but instead the input terminal *t7* should be used as indicated in the block circuits in FIGS. 1, 2 and 3.

The anode of the tube B2 is directly connected via conductor 61 to the terminal *t3*. The gas filled or neon indicator tubes L1, L2, connected via conductors 44 and 45 to the anodes of the tubes B1 and B2 respectively, are also connected by a common resistance R24 to the terminal *t2* and thence via conductor 47 to the positive pole of the battery V5. Terminals *t1* and *t12* of this trigger circuit T15 supply the current for heating the cathodes of the tubes B1 and B2.

Now regarding the operation of the trigger circuit T15, if the control grid of the tube B1 is strongly negative with respect to its cathode, it is non-conductive and carries no current; and via the voltage divider or potentiometer R17/R18, a positive potential is applied to the control grid of the tube B2 through resistor R17, conductor 44 and resistors R7/R8 connected to the positive terminal *t2*. The tube B2 is then conductive which makes its anode voltage lower or less positive than the anode voltage of the tube B1, so that the indicator lamp or tube L2 glows and indicator lamp or tube L1 is extinguished. The output terminal *t9* thus has a higher positive than the output terminal *t4*, and terminal *t6* thus has a voltage which is intermediate the voltages of the output terminals *t9* and *t4*, because the resistors R15 and R16 are preferably selected to have equal ohmic values.

When the potential to the control grid of the tube B1 rises or becomes more positive to a predetermined voltage, this tube B1 will become conductive placing a more negative voltage on the grid of the tube B2 through resistor R17, and as a result of which the tube B2 will then become nonconductive. The indicator lamp L1 then begins to glow and lamp L2 is then extinguished. The output terminals *t9* and *t4* then also interchange their voltages. Thus, either polarity output terminals may be used as required, such as terminals 2*t9* in FIG. 1, 5*t9* in FIG. 2, and 11*t9* in FIG. 3, can be used as opposite polarity input circuits from those for circuits 11 in FIG. 1, and I4 in FIG. 2, and I7, I8, I9 and I10 in FIG. 3, respectively.

The trigger circuit shown in FIG. 4 is so connected that the transition from one condition to the other takes place substantially instantaneously or with a jump, that is, it triggers, which action occurs within a small voltage range of say about 1 volt or plus or minus half a volt of the predetermined control voltage at the input terminal *t7* or *t8*. In either condition of the circuit, however, the terminal *t6* has substantially the same voltage because the resistors R15 and R16 are equal. Thus, if the input terminal *t7* bears a voltage that is nearly equal to the voltage of the terminal *t6*, i.e. slightly below or slightly above (i.e. more negative or more positive than) that on terminal *t6*, the condition of the circuit changes.

This operation may be more clearly illustrated by a specific example, the results of which are shown on the graphs in FIG. 5. In one example the values of the resistances or resistors have been considered to be as follows:

R7=R8=R9=R10=R11=R12=R13=R14=R15=R16=39 kilohms (KΩ); R17=R18=R19=R20=R22=1 megohm (MΩ); R6=50 KΩ; R21=270 KΩ; R23=470 KΩ; R24=820 KΩ. The battery potential V5 between terminals *t2* and *t11* may amount to 220 volts.

With the tube B1 non-conductive, the output terminals *t9* and *t4* bear voltages of about 80 volts and about 60 volts, respectively (see curves T9 and T4 in FIG. 5) and the input voltage at terminal *t7* or *t8* will be lower than 70 volts; while terminal *t6* has a voltage of 70 volts (see curve T6 in FIG. 5). If the input voltage (the abscissa) of the graph shown at B in FIG. 5 is increased above 70 volts to about 70.5 volts, the output voltage (the ordinate) at terminal *t4* and curve T4 changes from 60 volts to 80 volts, and terminal *t9* and curve T9 changes from 80 volts to 60 volts. In the case of a further increase of the input voltage at terminal *t7* or *t8*, the voltages occurring at the output terminals *t4* and *t9* remain practically unchanged as can be seen by the substantially horizontal lines T4 and T9 of the curves in FIG. 5. If the input voltage is decreased, the voltage will revert to the original condition when the input voltage reduces to about 69.5 volts (see the dotted lines at B in FIG. 5).

If the output terminals *t9* and *t4* are loaded, the voltage occurring at these terminals would change, which also would change the voltage occurring at terminal *t6*, because it is connected to have a voltage halfway between that at terminals *t9* and *t4*, and since there is a coupling between the control grid of the tube B2 through a resistance R21 and the terminal *t6*, there would also be a change in the input voltage to the tube B2 which would cause the circuit to change its condition. However, since several of these circuits must cooperate in one system according to this invention, the terminals *t6*, 16*t6*, 17*t6* and 18*t6* are connected together via conductor 56 so that the voltage levels at these terminals remain constant and as equal as possible.

The output of the tubes B1 and B2 at terminals *t10* and *t3* and indicated by curves T10 and T3, respectively, are disclosed in FIG. 5 to have a wider voltage range than those taken from the terminals *t9* and *t4*, because of the resistances of the voltage dividers or potentiometers R11/R12 and R13/R14, to the intermediate taps of which via conductors 48 and 49, respectively, the output terminals *t9* and *t4* are connected. There is also shown for comparison purposes at the top of FIG. 5, a graph of the grid current in microamperes ($\mu$a.) of the tube B1 with respect to the input voltages at terminal *t7* to show when the tube B1 is conductive with respect to the voltages at output terminals *t3*, *t4*, *t9* and *t10*.

The multi-vibrator type of trigger circuit T15 shown in FIG. 4 may be modified in several respects without departing from the scope of this invention depending upon the use to which it is to be applied and the system in which it is to be used. Thus, for example the output terminal *t5* (see FIG. 4), which may have the same potential as at output terminal *t4*, is of high ohmic value or nature and may be connected to the input terminal *t8* as a stabilizer, so that the condition of the trigger circuit remains unchanged after the controlling input voltage has been taken away from the input terminal *t7* or *t8*. Such a circuit connection is shown by dotted line conductor 70 and is employed in converting the standard circuit of FIG. 4 to a memory device or storing circuit and thus may be used for pulse control as well as for potential control purposes. Together with the connection 70, another dotted line connection may be made to the output terminal *t3* comprising a delay circuit of a condenser C1 and a resistance R25 to which may be connected a switch 75 so that a prior potential stored in or a prior state of the trigger circuit may be transferred through the switch 75 each time a subsequent potential is to be applied to the trigger circuit for storing, without being immediately cancelled by the application of the new signal to be stored.

If desired, the unidirectional resistances or rectifiers shown in the circuits of FIGS. 1, 2 and 3 may be replaced by diodes, transistors, germanium triodes, crystal triodes, or the like, without departing from the principle or scope of this invention.

While there is described above the principles of this invention in connection with specific apparatus, it is to be clearly understood that this description is made only by way of example and not as a limitation to the scope of this invention.

What is claimed is:

1. A gating circuit comprising: an input multivibrator type of trigger switching circuit; an output multivibrator type of trigger switching circuit; each of said trigger circuits having at least an input terminal, a voltage divider having an intermediate tapping connection, and an output terminal connected to said tapping connection of said voltage divider; and a connecting means connected between an output terminal of said input trigger circuit and an input terminal of said output trigger circuit, said connecting means comprising: a pair of uni-directional resistances each having a cathode terminal and an anode terminal, said uni-directional resistances being connected in series with like terminals thereof connected together to form a junction between said uni-directional resistances, means for connecting a constant voltage source to said junction corresponding in polarity to the like polarities of said terminals, at least one additional circuit means connected to said junction through an additional uni-directional resistance having its terminal of like polarity to that of said pair of uni-directional resistances also connected to said junction for further controlling the potential of said junction and the input of said output trigger circuit, and stabilizing connection means connected to said tapping connection of said voltage dividers of both said input and said output trigger circuits for stabilizing the output of said trigger circuits.

2. A gating circuit according to claim 1 including a leakage resistance between said junction and said voltage source.

3. A gating circuit according to claim 1 wherein the means for connecting the constant voltage source to said junction has an impedance value between that of the output of said input trigger circuit and the input of said output trigger circuit.

4. A gating circuit according to claim 1 wherein said uni-directional resistances comprise rectifiers.

5. A gating circuit according to claim 1 wherein all of said uni-directional resistances have their cathodes connected to said junction.

6. A gating circuit according to claim 1 wherein all said uni-directional resistances have their anodes connected to said junction.

7. A system according to claim 1 including an additional junction in said connecting means between one of said pair of uni-directional resistances and its adjacent trigger circuit, and including further additional uni-directional resistances connected to said additional junction, like terminals of said further additional uni-directional resistances being connected to said additional junction opposite to those terminals connected to the said first junction, and additional constant voltage means for applying a different potential to said additional junction.

8. A gating circuit according to claim 1 wherein said additional circuit means includes a switching device.

9. A gating circuit according to claim 8 wherein said switching device is a multivibrator output type trigger circuit including a voltage divider having a tapping connection and an output terminal connected to said tapping connection, and said stabilizing connection means includes means connected to said tapping connection of said additional multivibrator output type trigger circuit for connecting said additional trigger circuit with said input and output trigger circuits for stabilizing all of said trigger circuits.

10. A gating circuit comprising: an input multivibrator type of trigger circuit; an output multivibrator type of trigger circuit; each of said multivibrator type of trigger circuits comprising: a pair of electronic valves each having a controlling terminal and a controlled terminal, an input connected to said controlling terminal of one of said valves, a separate output associated with and connected to the control terminal of each of said valves, two pairs of voltage dividers each having an intermediate tapping connection, one pair connected to and associated with the control terminal of each valve, said output being connected to the tapping connection of one voltage divider of each pair, the controlling terminal of the other valve being connected to the tapping connection of the other voltage divider associated with said one valve, a gating circuit connected between an output of said input trigger circuit and the input of said output trigger circuit; and a stabilizing constant potential source connected via high ohmic resistances of equal value to the intermediate tapping connections of all of said voltage dividers for both said input and said output trigger circuits.

11. A circuit according to claim 10 including a connection to the other voltage divider associated with said other valve to have a voltage following that of said output.

12. A circuit according to claim 10 including means to indicate which one of said pair of electronic valves in each trigger circuit is conductive at any given time.

13. A control circuit for a bistable multivibrator type of trigger circuit having an input terminal, a voltage divider having an intermediate tapping connection, and an output terminal connected to said tapping connection, said control circuit comprising: a first rectifier having an anode and a cathode terminal with one of said terminals connected to said input terminal of said trigger circuit, a second rectifier having an anode and a cathode terminal connected through a junction to the other terminal of said first rectifier so that like terminals of said rectifiers are connected to said junction, constant voltage means for applying a potential to said junction corresponding to the polarity of the terminals of the rectifiers connected thereto, a second bistable multivibrator type of trigger circuit having a voltage divider with a tapping connection and an output terminal connected to said tapping connection and to the opposite terminal of said second rectifier away from said junction for applying a controlling potential to said junction, and stabilizing connection means connected to said tapping connections of said voltage dividers of both said bistable multivibrator type of trigger circuits for stabilizing the outputs from both said bistable multivibrator type of trigger circuits.

14. An electrical system comprising a plurality of input trigger circuits, a plurality of output trigger circuits, each trigger circuit having a separate input terminal, a voltage divider having an intermediate tapping connection, and an output terminal connected to said tapping connection, a plurality of static control means each comprising at least a pair of rectifiers with like terminals thereof connected together to form a junction between them, a constant voltage source connected to said junction, said static control means connecting the output terminals of the input trigger circuits with the input terminals of the output trigger circuits, the impedance of the output terminals of the input trigger circuits being less than the impedance of the input terminals of said output trigger circuits, and the impedance of said constant voltage source being intermediate the impedance of said output and input terminals of said input and output trigger circuits, and stabilizing connection means connected to said tapping connection of each of said trigger circuits for stabilizing the zero potential level of all of said trigger circuits of said system.

15. A system comprising an alternate series of electronic relay devices and trigger circuits, each of said electronic relay devices comprising an input trigger circuit and an output trigger circuit, a gating means between said trigger circuits, each of said trigger circuits having a voltage divider with an intermediate tapping connection and an output terminal connected to said tapping connection; and resistance means connected to said tapping connections of all of said trigger circuits for connecting all of said trigger circuits together to stabilize said system.

16. A gating circuit comprising an input multivibrator type of trigger circuit, an output multivibrator type of trigger circuit, each of said trigger circuits having an input terminal, a voltage divider having an intermediate tapping connection, and an output terminal connected to said tapping connection, a gating circuit connected between the output terminal of said input trigger circuit and the input terminal of said output trigger circuit, and stabilizing connection means connected to said tapping connections of said voltage dividers of both said input and output trigger circuits for stabilizing the outputs from said trigger circuits.

17. A gating circuit according to claim 16 wherein said stabilizing connection means includes resistance means.

References Cited in the file of this patent

UNITED STATES PATENTS

| | | |
|---|---|---|
| 2,524,134 | Palmer | Oct. 3, 1950 |
| 2,557,729 | Eckert | June 19, 1951 |
| 2,636,133 | Hussey | Apr. 21, 1953 |
| 2,644,887 | Wolfe | July 7, 1953 |
| 2,647,999 | Best | Aug. 4, 1953 |
| 2,657,318 | Rack | Oct. 27, 1953 |
| 2,688,695 | Odell | Sept. 7, 1954 |
| 2,719,670 | Jacobs | Oct. 4, 1955 |
| 2,735,005 | Steele | Feb. 14, 1956 |
| 2,802,107 | Arwold | Aug. 6, 1957 |
| 2,803,747 | Woods | Aug. 20, 1957 |
| 2,807,716 | Steele | Sept. 24, 1957 |
| 2,808,202 | Hahn | Oct. 1, 1957 |
| 2,851,219 | Hussey | Sept. 9, 1958 |
| 2,857,516 | Perlmutter | Oct. 21, 1958 |
| 2,884,521 | Eckert | Apr. 28, 1959 |
| 2,910,584 | Steele | Oct. 27, 1959 |
| 2,923,817 | Wanlass | Feb. 2, 1960 |